(12) United States Patent  
Fontaine

(10) Patent No.: US 9,336,618 B1  
(45) Date of Patent: May 10, 2016

(54) STOCHASTIC CHUNK-BASED MAP GENERATION

(71) Applicant: Kabam, Inc., San Francisco, CA (US)

(72) Inventor: Thomas Fontaine, San Mateo, CA (US)

(73) Assignee: KABAM, INC., San Francisco, CA (US)

( * ) Notice: Subject to any disclaimer, the term of this patent is extended or adjusted under 35 U.S.C. 154(b) by 272 days.

(21) Appl. No.: 13/668,147

(22) Filed: Nov. 2, 2012

(51) Int. Cl.
*G06T 11/40* (2006.01)
*G06T 17/05* (2011.01)
*G06T 15/04* (2011.01)

(52) U.S. Cl.
CPC .................. *G06T 11/40* (2013.01); *G06T 15/04* (2013.01); *G06T 17/05* (2013.01)

(58) Field of Classification Search
CPC ......... G06T 17/00; G06T 17/05; G06T 17/10; G06T 17/20; G06T 11/40; G06T 15/04
See application file for complete search history.

(56) References Cited

U.S. PATENT DOCUMENTS

| | | | |
|---|---|---|---|
| 6,123,619 A | 9/2000 | Tokita et al. | 463/43 |
| 6,319,129 B1 | 11/2001 | Igarashi et al. | 463/31 |
| 6,961,055 B2 | 11/2005 | Doak et al. | 345/419 |
| 7,414,629 B2 * | 8/2008 | Santodomingo et al. | 345/582 |
| 7,728,837 B2 | 6/2010 | Szymanski et al. | 345/473 |
| 2001/0045949 A1 * | 11/2001 | Chithambaram et al. | 345/418 |
| 2003/0058238 A1 * | 3/2003 | Doak et al. | 345/419 |
| 2005/0264576 A1 * | 12/2005 | Sommers | 345/543 |
| 2007/0206023 A1 | 9/2007 | Street et al. | 345/582 |
| 2009/0005140 A1 * | 1/2009 | Rose et al. | 463/7 |
| 2009/0244074 A1 * | 10/2009 | Montrym et al. | 345/522 |
| 2010/0298050 A1 * | 11/2010 | Taraschuk et al. | 463/31 |
| 2011/0219009 A1 * | 9/2011 | Rosenfeld et al. | 707/743 |
| 2012/0095945 A1 * | 4/2012 | Jones | G06N 5/00 706/45 |
| 2012/0268468 A1 * | 10/2012 | Elenzil | 345/441 |

OTHER PUBLICATIONS

"Tile Engine," by Wikipedia. Revision of Jan. 23, 2011. Available at: http://en.wikipedia.org/w/index.php?title=Tile_engine&oldid=409645739.*

"Tile-Based Texture Mapping on Graphics Hardware," by Wei, Li-Yi. In: Graphics Hardware (2004). Available at: http://graphics.stanford.edu/papers/tile_mapping_gh2004/final/paper_final.pdf.*

"Procedural Level Generation Using Occupancy-Regulated Extension," by Mawhorter & Mateas. In: Computational Intelligences and Games (2010). Available at: IEEE.*

"Tiling Triangular Meshes," by lu, Ming-Yee. In: EPFL I&C. Available at: http://www.user00.com/my2iu/workshop/tile/tile.pdf (2007). Last modified status of 2007 available at: http://www.user00.com/my2iu/workshop/tile/.*

(Continued)

*Primary Examiner* — Daniel Kinsaul

(74) *Attorney, Agent, or Firm* — Sheppard Mullin Richter & Hampton LLP

(57) ABSTRACT

An approach to facilitating stochastic chunk-based map generation is provided. Tile chunks may be obtained for inclusion in a map of a virtual space. The obtained tile chunks may include first and second tile chunks having map tiles of different tile types. The first tile chunk may have a first tile of a first tile type and a second tile of a second tile type different from the first tile type. The second tile chunk may have a third tile of a third tile type and a fourth tile of a fourth tile type different from the third tile type. Stochastic distribution of the obtained tile chunks over a map area in the map may be effectuated. Distribution of individual map tiles between the distributed tile chunks on the map area may be effectuated.

14 Claims, 4 Drawing Sheets

(56) References Cited

OTHER PUBLICATIONS

"Rendering Massive Terrains Using Chunked Level of Detail Control," by Ulrich, Thatcher. In: Oddworld Inhabitants (2002). Available at: http://tulrich.com/geekstuff/sig-notes.pdf. Available online at least as early as 2004 as evidenced by Wayback Machine: http://web.archive.org/web/20040515000000*/http://tulrich.com/geekstuff/sig-notes.pdf.*

"Interactive Mapping on 3-D Terrain Models," by Bernardin et al. In: G3, vol. 7, No. 10 (2006). Available at: Wiley.*

"Seamless Rendering of Large Scale Terrain," by Deng et al. In: Advanced Engineering Forum, vols. 6-7, pp. 1026-1030 (Sep. 2012). Available at: http://www.scientific.net/AEF.6-7.1026.*

* cited by examiner

US 9,336,618 B1

STOCHASTIC CHUNK-BASED MAP GENERATION

FIELD OF THE DISCLOSURE

This disclosure relates generally to providing stochastic chunk-based map generation, for instance, based on individual tile chunks having map tile of different tile types.

BACKGROUND

Service providers of games, virtual worlds, and/or other virtual spaces often utilize large maps to provide users with environments that facilitates extensive interactions, continuous explorations, more area for the users to control, manage, or move around in, etc. These maps may, for instance, be generated on-the-fly to (as opposed to using predefined maps) to deliver a better user experience to users by reducing predictability of the environments provided by the maps. Nonetheless, generation of large maps generally entails substantial costs with respect to processing and memory resources of servers. While repeating tile patterns in generating maps may curtail some of those costs, such techniques may negatively affect the user experience, for instance, by increasing predictability of the map environment, by reducing realism associated with the map environment, and by giving an unfair advantage to users that memorize the repeated patterns in the environment. Accordingly, alternative and/or additional approaches to such techniques may be advantageous.

SUMMARY

One aspect of the disclosure relates to a system configured to facilitate stochastic chunk-based map generation, in accordance with one or more implementations. In exemplary implementations, predefined tile chunks having map tiles of different tile types may be stochastically distributed over a map area in a map of a virtual space, and individual map tiles may be distributed between the distributed tile chunks on the map area. In certain implementations, the predefined tile chunks may include a first tile of a first tile type and a second tile of a second tile type different from the first tile type, and a second tile chunk having a third tile of a third tile type and a fourth tile of a fourth tile type different from the third tile type. In this way, stochastic chunk-based map generation allows art teams to change styles of maps and/or games without the need for an engineering team to modify technology and/or code associated with the games. It should be noted that, in various implementations, the tile chunks, the map tiles, the map area, the map, etc., may be transparently suitable for 2D environments, 2.5D environments, 3D environments, and/or other environments of one or more virtual spaces.

In some implementations, the system may include one or more servers. The server(s) may be configured to communicate with one or more client computing platforms according to a client/server architecture. The users may access the system via the client computing platforms, for instance, to interact with one or more services.

The server(s) may be configured to execute one or more computer program modules to facilitate stochastic chunk-based map generation. The computer program modules may include one or more of a chunk retrieval module, a chunk placement module, a rule module, a map filler module, a chunk manager module, a game module, and/or other modules. It is noted that, in some implementations, the client computing platforms may be configured to execute one or more computer program modules that are the same as or similar to the computer program modules of the server(s) to facilitate stochastic chunk-based map generation.

The system may include an electronic storage having electronic storage media that electronically stores information. For example, the electronic storage media may be non-transient electronic storage media storing individual tile chunks. As indicated, the individual tile chunks may include map tiles of different tile types for inclusion in one or more maps of a virtual space. The individual tile chunks may include first and second tile chunks, where the first tile chunk includes a first tile of a first tile type and a second tile of a second tile type different from the first tile type, and the second tile chunk includes a second tile chunk having a third tile of a third tile type and a fourth tile of a fourth tile type different from the third tile type. It should be noted that, in some implementations, the electronic storage may be a part of the server(s), a part of a given client computing platform, and/or a separate component of the system.

The chunk retrieval module may be configured to obtain tile chunks so that the obtained tile chunks can be included in a map of a virtual space. The obtained tile chunks may include map tiles of different tile types for inclusion in one or more maps of the virtual space. For example, the obtained tile chunks may include the first tile chunk (e.g., having a first tile of a first tile type and a second tile of a second tile type different from the first tile type) and the second tile chunk (e.g., having a third tile of a third tile type and a fourth tile of a fourth tile type different from the third tile type).

In various implementations, the map tiles of the different tile types may include one or more terrains of different terrain types such that the first tile includes a first terrain of a first terrain type, the second tile includes a second terrain of a second terrain type different from the first terrain type, the third tile includes a third terrain of a third terrain type, and the fourth tile includes a fourth terrain of a fourth terrain type different from the third terrain type. By way of example, terrain types may include plains, deserts, forests, mountains, hills, swamps, paved roads, dirt roads, ice sheets, cities, beaches, rivers, lakes, seas, oceans, and/or other terrain types. Each of the terrain types may include one or more levels such that a higher-level terrain of a terrain type is associated with a higher elevation than a lower-level terrain of that terrain type.

The chunk placement module may be configured to effectuate stochastic distribution of the obtained tile chunks over a map area in the map of the virtual space such that, responsive to the chunk retrieval module obtaining the first and second tile chunks, the first and second tile chunks are stochastically distributed within the map area. In certain implementations, the rule module may be configured to obtain one or more chunk placement rules relating to spacing between the obtained tile chunks. In some implementations, the chunk placement rules may indicate spacing between the obtained tile chunks that is based on respective tiles types associated with the obtained tile chunks. The chunk placement module may be configured such that stochastically distribution of the obtained chunk tiles over the map area may be based on the chunk placement rules.

The map filler module may be configured to effectuate distribution of individual map tiles between the distributed tile chunks on the map area. By way of example, the individual map tiles may be distributed between the distributed tile chunks to provide map tiles in various empty spaces that the distributed tile chunks are not occupying in the map area.

In various implementations, the rule module may be configured to obtain one or more tile placement rules relating to spacing between a tile of one tile type and a tile of another tile type. The map filler module may be configured such that the individual map tiles are distributed between the distributed tile chunks based on the tile placement rules.

In some implementations, the chunk manager module may be configured to facilitate one of more of creation, modification, or removal of one or more tile chunk sets, where the tile chunk sets include a first tile chunk set having the obtained tile chunks. By way of example, the chunk manager module may enable a developer, an administrator, and/or a user of the virtual space to maintain the tile chunk sets, such that the tile chunk sets include predefined tile chunks.

In certain implementations, the game module may be configured to execute an instance of the virtual space, and initiate generation of the map including the map area for the instance of the virtual space. By way of example, the initiation of the map generation may initiate the stochastic distribution of the obtained tile chunks over the map area, and the distribution of the individual map tiles between the distributed tile chunks on the map area.

In some implementations, the game module may be configured to detect one or more in-spaces actions by one or more users that indicate a need for a new map area. The chunk placement may be configured such that the stochastic distribution of the obtained tile chunks over the map area is responsive to the detection of the in-space actions. By way of example, the in-space actions may relate to a need to extend a map of a virtual space, a need to regenerate an old map area in the map (e.g., to replace the old map area with the new map area), a need for additional map areas in the map, a need for temporary space in the virtual world (e.g., a new map area is needed to play a mini-game initiated by a user in the virtual world), and/or other needs for new map areas.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
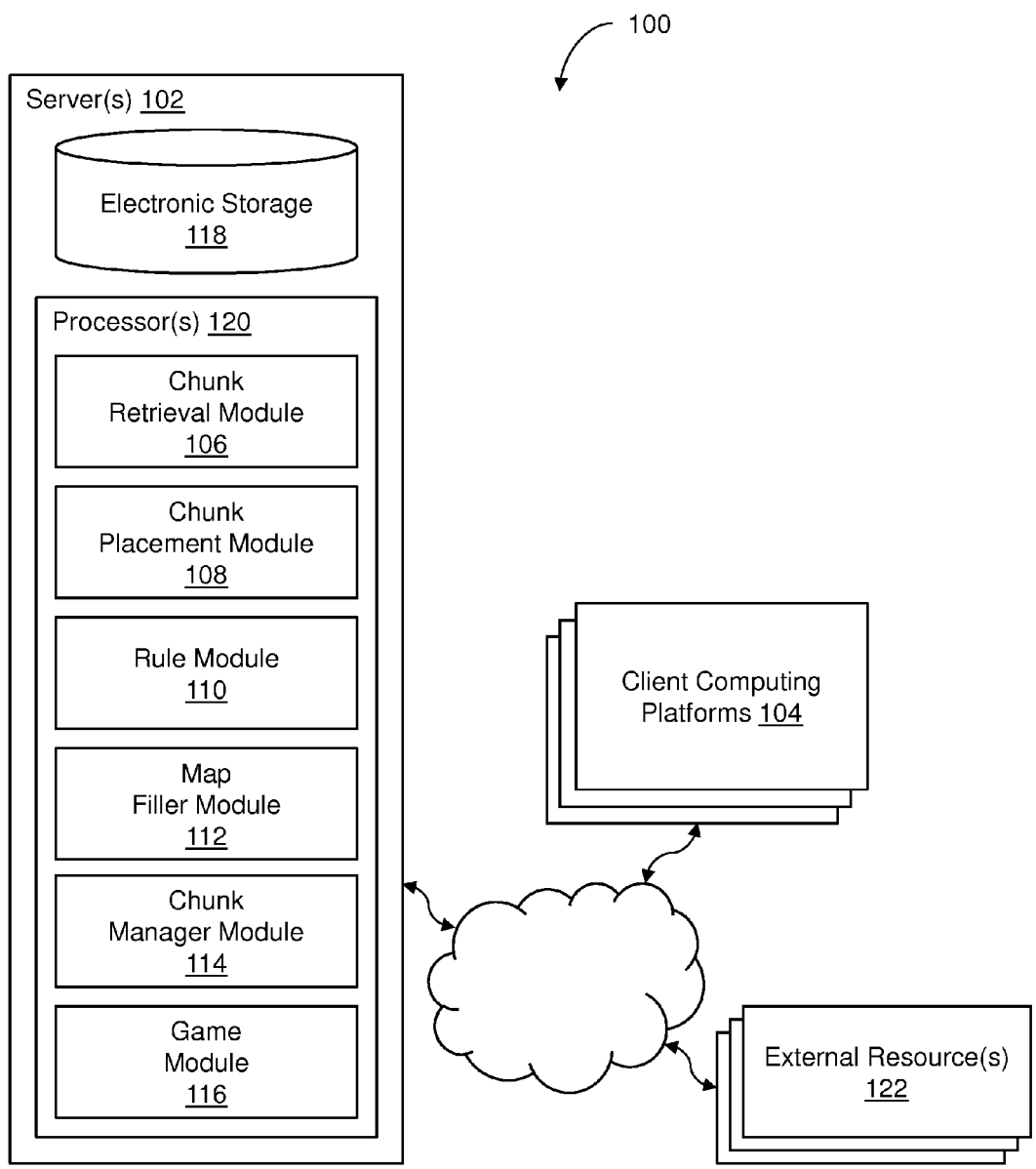
FIG. 1 illustrates a system configured to facilitate stochastic chunk-based map generation, in accordance with one or more implementations.

FIG. 1 illustrates a system 100 configured to facilitate stochastic chunk-based map generation, in accordance with one or more implementations. In exemplary implementations, predefined tile chunks having map tiles of different tile types may be stochastically distributed over a map area in a map of a virtual space, and individual map tiles may be distributed between the distributed tile chunks on the map area. In certain implementations, the predefined tile chunks may include a first tile of a first tile type and a second tile of a second tile type different from the first tile type, and a second tile chunk having a third tile of a third tile type and a fourth tile of a fourth tile type different from the third tile type. In this way, stochastic chunk-based map generation allows art teams to change styles of maps and/or games without the need for an engineering team to modify technology and/or code associated with the games. It should be noted that, in various implementations, the tile chunks, the map tiles, the map area, the map, etc., may be transparently suitable for 2D environments, 2.5D environments, 3D environments, and/or other environments of one or more virtual spaces.

In some implementations, system 100 may include one or more servers 102. Server(s) 102 may be configured to communicate with one or more client computing platforms 104 according to a client/server architecture. The users may access system 100 via client computing platforms 104, for instance, to interact with one or more services.

Server(s) 102 may be configured to execute one or more computer program modules to facilitate stochastic chunk-based map generation. The computer program modules may include one or more of a chunk retrieval module 106, a chunk placement module 108, a rule module 110, a map filler module 112, a chunk manager module 114, a game module 116, and/or other modules. As noted, in some implementations, client computing platforms 104 may be configured to execute one or more computer program modules that are the same as or similar to the computer program modules of server(s) 102 to facilitate stochastic chunk-based map generation.

System 100 may include an electronic storage 118 having electronic storage media that electronically stores information. For example, the electronic storage media may be non-transient electronic storage media storing individual tile chunks. The individual tile chunks may include map tiles of different tile types for inclusion in one or more maps of a virtual space. The individual tile chunks may include first and second tile chunks, where the first tile chunk includes a first tile of a first tile type and a second tile of a second tile type different from the first tile type, and the second tile chunk includes a second tile chunk having a third tile of a third tile type and a fourth tile of a fourth tile type different from the third tile type. It should be noted that, in some implementations, electronic storage 118 may be a part of server(s) 102, a part of a given client computing platform 104, and/or a separate component of system 100.

Chunk retrieval module 106 may be configured to obtain tile chunks so that the obtained tile chunks can be included in a map of a virtual space. The obtained tile chunks may include map tiles of different tile types for inclusion in one or more maps of the virtual space. For example, the obtained tile chunks may include the first tile chunk (e.g., having a first tile of a first tile type and a second tile of a second tile type different from the first tile type) and the second tile chunk (e.g., having a third tile of a third tile type and a fourth tile of a fourth tile type different from the third tile type).

In various implementations, the map tiles of the different tile types may include one or more terrains of different terrain types such that the first tile includes a first terrain of a first terrain type, the second tile includes a second terrain of a second terrain type different from the first terrain type, the third tile includes a third terrain of a third terrain type, and the fourth tile includes a fourth terrain of a fourth terrain type different from the third terrain type. By way of example, terrain types may include plains, deserts, forests, mountains, hills, swamps, paved roads, dirt roads, ice sheets, cities, beaches, rivers, lakes, seas, oceans, and/or other terrain types.

The individual terrain types may have different terrain characteristics. Terrain characteristics may impact objects disposed within a map tile, impact objects moving through the map tile, impact a value of holding or possessing the map tile, may impact buildings built on the map tile, and/or may have other impacts in the virtual space. For example, a forest terrain may have terrain characteristics that facilitate defense during battle, impede attacks during battle, impede travel through a forest, require expenditure of additional resources before a building can be built (e.g., to clear the foliage), and/or other impacts. Other examples are contemplated.

Individual tiles may be assigned with a level. The level of a given tile may dictate the degree to which the terrain characteristics of a terrain type assigned to the given tile are present in the given tile. For example, a higher level may cause the terrain characteristics of the terrain type assigned to the given map tile to have greater impact than another map tile of the same terrain type but with a lower level. In some implementations, tiles of the same tile type may have different appearances from each other to denote differences in level.

In some implementations, a tile type of a map tile may indicate a terrain type associated with the map tile, a level of the terrain type associated with the map tile, and/or other type. For example, mountain-type-one map tiles may include map tiles having mountain terrains that are between zero to three levels high (e.g., 41 to 100 meters above sea level for mountain terrains), and mountain-type-two map tiles may include map tiles having mountain terrains that are between four and seven levels high (e.g., 101 to 160 meters above sea level for mountain terrains).

An instance of the virtual space may be executed by computer modules to determine views of the virtual space. The views may then be communicated (e.g., via streaming, via object/position data, and/or other information) from server(s) 102 and/or other source to client computing platforms 104 for presentation to users. The view determined and transmitted to a given client computing platform 104 may correspond to a user character being controlled by a user via client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may include a 2-dimensional topography. In other instances, the topography may include a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

Figure 2:
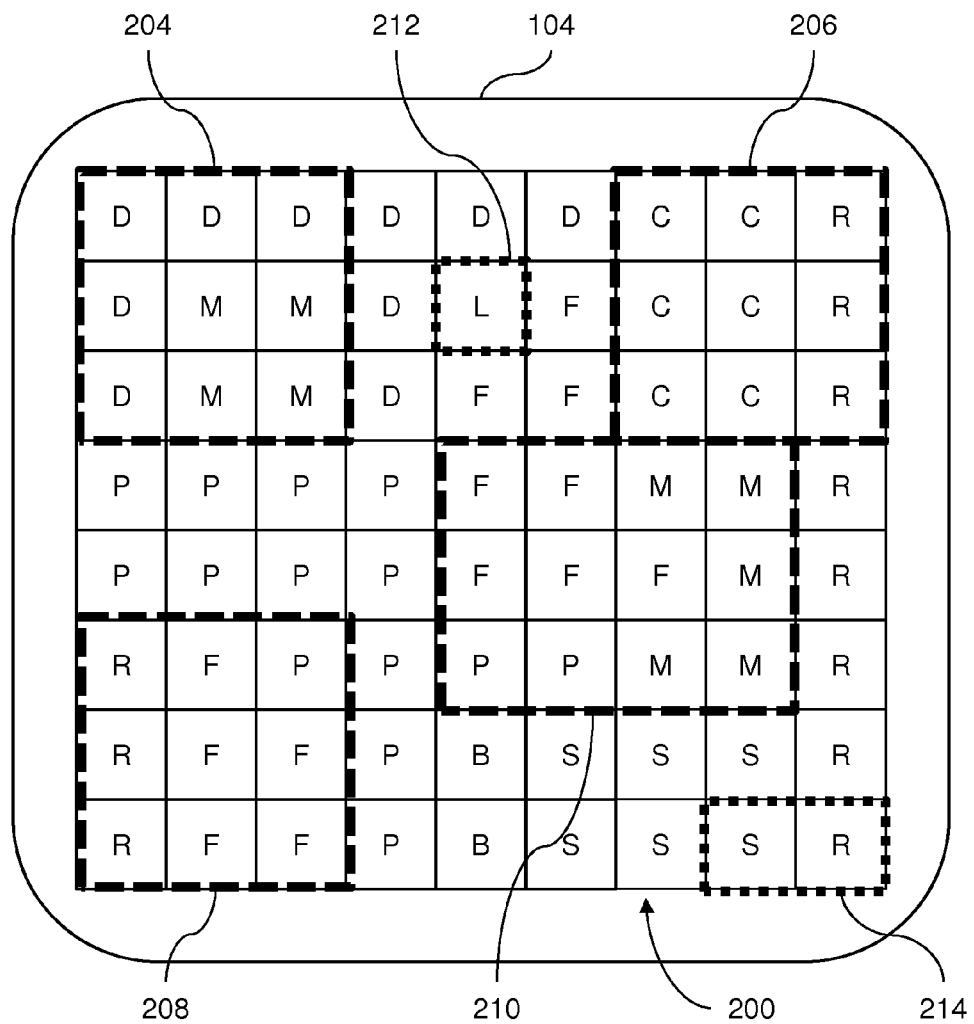
FIG. 2 illustrates a map with a stochastically-generated map area, in accordance with one or more implementations.

Chunk placement module 108 may be configured to effectuate stochastic distribution of the obtained tile chunks over a map area in the map of the virtual space such that, responsive to the chunk retrieval module obtaining the first and second tile chunks, the first and second tile chunks are stochastically distributed within the map area. For example, FIG. 2 illustrates a map with a stochastically-generated map area 200, in accordance with one or more implementations. With respect to FIG. 2, map tiles of different tile types are represented by letters where each letter represents a different tile type. Map area 200 may include larger tile chunks 204, 206, 208, and 210 (e.g., having map tiles of different type tiles), smaller groups of map tiles 214, and individual map tiles 212. In one use case, chunk placement module 108 may have stochastically distributed tile chunks 204, 206, 208, and 210 over map area 200, resulting in tile chunks 204, 206, 208, and 210 being placed in their current respective positions within map area 200 as shown in FIG. 2.

In certain implementations, rule module 110 may be configured to obtain one or more chunk placement rules relating to spacing between the obtained tile chunks. In some implementations, the chunk placement rules may indicate spacing between the obtained tile chunks that is based on respective tiles types associated with the obtained tile chunks. Chunk placement module 108 may be configured such that stochastically distribution of the obtained chunk tiles over the map area may be based on the chunk placement rules. In one scenario, the chunk placement rules may indicate that adjoining chunk tiles must be at least one tile space away from one another if their respective edge map tiles are incompatible adjoining map tiles. For example, a first edge of a first tile chunk may not be placed adjacent to a second edge of a second tile chunk if: (1) map tiles with ice sheet terrains and map tiles with swamp terrains are incompatible adjoining map tiles; (2) the first edge of the first tile chunk has map tiles with ice sheet terrains; and (3) the second edge of the second tile chunk has map tiles with swamp terrains.

Map filler module 112 may be configured to effectuate distribution of individual map tiles between the distributed tile chunks on the map area. By way of example, the individual map tiles may be distributed between the distributed tile chunks to provide map tiles in various empty spaces that the distributed tile chunks are not occupying in the map area. With respect to FIG. 2, for instance, individual maps tiles 212 (along with smaller groups of map tiles 214) may be distributed between tile chunks 204, 206, 208, and 210 to fill portions of map area 200 that tile chunks 204, 206, 208, and 210 do not cover.

In various implementations, rule module 110 may be configured to obtain one or more tile placement rules relating to spacing between a tile of one tile type and a tile of another tile type. Map filler module 112 may be configured such that the individual map tiles are distributed between the distributed tile chunks based on the tile placement rules. By way of example, tile placement rules may designate certain tile types as incompatible adjoining tile types. Thus, map filler module 112 may avoid placing an individual map tile next to another map tile if a tile type of the individual map tile and a tile type of the other map tile are incompatible adjoining tile types.

In some implementations, chunk manager module 114 may be configured to facilitate one of more of creation, modification, or removal of one or more tile chunk sets, where the tile chunk sets include a first tile chunk set having the obtained tile chunks. By way of example, chunk manager module 114 may enable a developer, an administrator, and/or a user of the virtual space to maintain the tile chunk sets, such that the tile chunk sets include predefined tile chunks. In one use case, chunk manager module 114 may provide an administrator with a user interface for creating and storing the first tile chunk set for later purposes such that, prior to those tile chunks being obtained for inclusion in virtual space maps, the first tile chunk is predefined with the first and second tiles, and the second tile chunk is predefined with the third and fourth tiles. In this way, chunk manager module 114 may facilitate quick and efficient generation of maps and map areas, while avoiding issues such as significant repetition in typical virtual space maps. For instance, the predefined map tiles may enable service providers the ability to avoid significant repetition without having to individually select all of the map tiles for a map, and, thus, avoiding substantial processing and memory costs associated with generating large maps (e.g., periodically, on-the-fly, per session, etc.).

In certain implementations, game module 116 may be configured to execute an instance of the virtual space, and initiate generation of the map including the map area for the instance of the virtual space. By way of example, the initiation of the map generation may initiate the stochastic distribution of the obtained tile chunks over the map area, and the distribution of the individual map tiles between the distributed tile chunks.

In some implementations, game module 116 may be configured to detect one or more in-spaces actions by one or more users that indicate a need for a new map area. The chunk placement may be configured such that the stochastic distribution of the obtained tile chunks over the map area is responsive to the detection of the in-space actions. By way of example, the in-space actions may relate to a need to extend a map of a virtual space, a need to regenerate an old map area in the map (e.g., to replace the old map area with the new map area), a need for additional map areas in the map, a need for temporary space in the virtual world (e.g., a new map area is needed to play a mini-game initiated by a user in the virtual world), and/or other needs for new map areas.

For example, in one scenario, while a user is interacting with an environment of a virtual space via a user character associated with the user, the user may cause the user character to run into an initial border of the environment as defined by an initial map of the virtual space. Such in-space actions by the user may be detected, and the environment may be dynamically extended on-the-fly via stochastic chunk-based generation of a new map area to define the extension of the environment in the map of the virtual space such that, after the generation of the new map area, the map may define the extension of the environment associated with the new map area. In another scenario, a virtual space may enable a user to "own" territories and to purchase additional territories. When the user provides payment for the additional territories, the game module 116 may trigger stochastic chunk-based generation of a new map area to define the additional territories in the current map associated with the virtual space such that, after the generation of the new map area, the map may define the additional territories associated with the new map area.

Server(s) 102, client computing platforms 104, external resources 122, and/or other components may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 104, external resources 122, and/or other components may be operatively linked via some other communication media.

A given client computing platform 104 may include one or more processors configured to execute computer program modules. The computer program modules may be configured to enable an expert or user associated with client computing platform 104 to interface with system 100 and/or external resources 122, and/or provide other functionality attributed herein to client computing platforms 104. By way of non-limiting example, client computing platform 104 may include one or more of a desktop computer, a laptop computer, a handheld computer, a netbook, a smartphone, a gaming console, and/or other computing platforms.

External resources 122 may include sources of information, hosts and/or providers of virtual spaces outside of system 100, external entities participating with system 100, and/or other resources. In some implementations, some or all of the functionality attributed herein to external resources 122 may be provided by resources included in system 100.

In some implementations, server(s) 102 may include electronic storage 118, one or more processor(s) 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

In some implementations, the electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platforms 104, and/or other information that enables server(s) 102 and/or client computing platforms 104 to function as described herein.

In some implementations, processor(s) 120 is configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute modules 106, 108, 110, 112, 114, 116, and/or other modules. Processor(s) 120 may be configured to execute modules 106, 108, 110, 112, 114, 116, and/or other modules by software; hardware; firmware; some combination of software, hardware, and/or firmware; and/or other mechanisms for configuring processing capabilities on processor(s) 120. As noted, in certain implementations, a given client computing platform 104 may include one or more computer program modules that is the same as or similar to the computer program modules of server(s) 102. Client computing platform 104 may include one or more processors that are the same or similar to processor(s) 120 of server(s) 102 to execute such computer program modules of client computing platform 104.

It should be appreciated that although modules 106, 108, 110, 112, 114, and 116 are illustrated in FIG. 1 as being co-located within a single processing unit, in implementations in which processor(s) 120 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor(s) 120 may be configured to execute one or more additional modules that may perform some or all of the functionality attributed below to one of modules 106, 108, 110, 112, 114, and/or 116.

Figure 3:
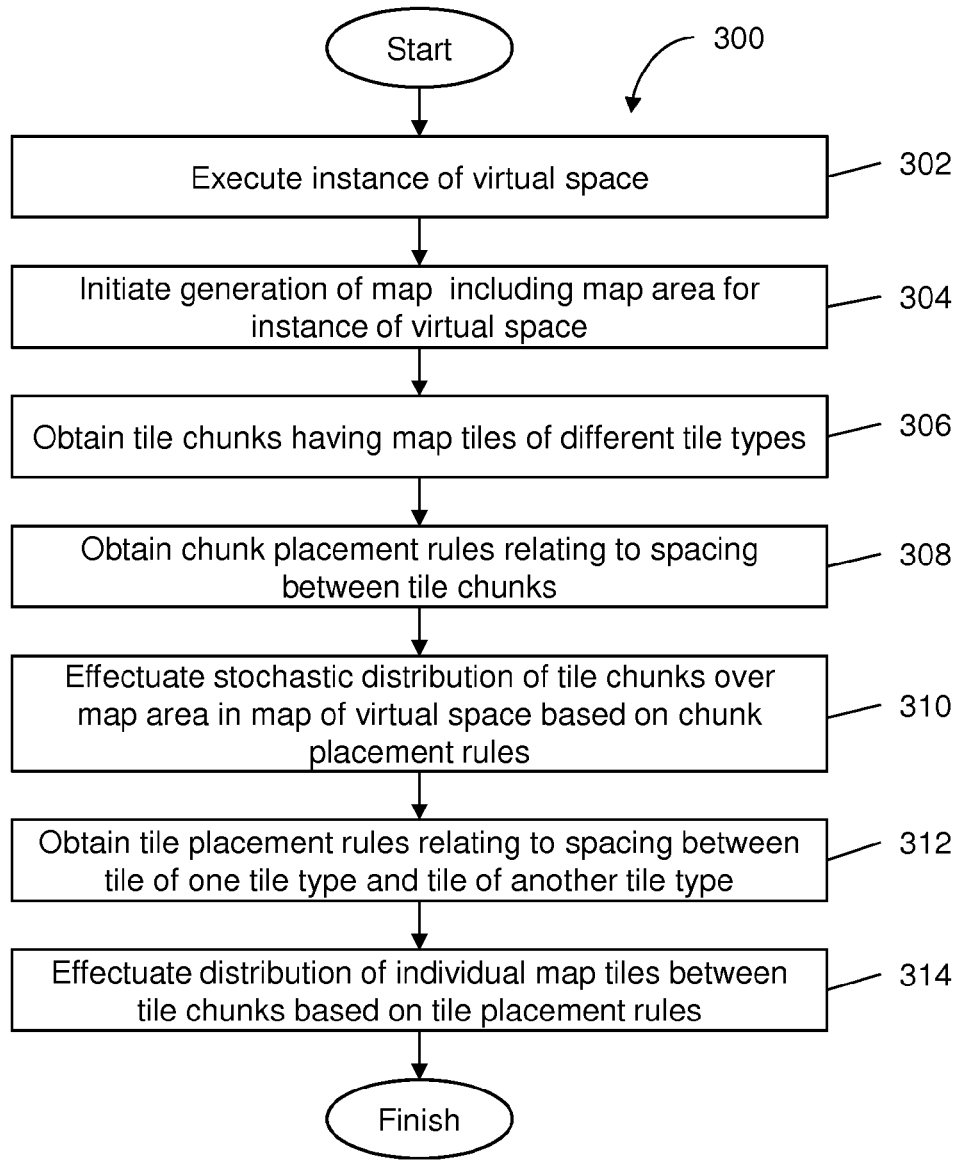
FIG. 3 illustrates a method for facilitating stochastic chunk-based map generation, in accordance with one or more implementations.

FIG. 3 illustrates a method for facilitating stochastic chunk-based map generation, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an instance of a virtual space may be executed. Operation 302 may be performed by a game module that is the same as or similar to game module 116, in accordance with one or more implementations.

At an operation 304, generation of a map including a map area may be initiated for the instance of the virtual space. In some implementations, the initiation of the map generation may initiate stochastic distribution of obtained tile chunks over the map area, and distribution of individual map tiles between the distributed tile chunks on the map area. Operation 304 may be performed by a game module that is the same as or similar to game module 116, in accordance with one or more implementations.

At an operation 306, tile chunks having map tiles of different tile types may be obtained so that the obtained tile chunks can be included in the map of the virtual space. The tile chunks may include first and second tile chunks. The first tile chunk may include a first tile of a first tile type and a second tile of a second tile type different from the first tile type. The second tile chunk may include a third tile of a third tile type and a fourth tile of a fourth tile type different from the third tile type. In some implementations, the map tiles of the different tile types may include one or more terrains of different terrain types such that the first tile may include a first terrain of a first terrain type, the second tile may include a second terrain of a second terrain type different from the first terrain type, the third tile may include a third terrain of a third terrain type, and the fourth tile may include a fourth terrain of a fourth terrain type different from the third terrain type. Operation 306 may be performed by a chunk retrieval module that is the same as or similar to chunk retrieval module 106, in accordance with one or more implementations.

At an operation 308, one or more chunk placement rules relating to spacing between the obtained tile chunks may be obtained. The chunk placement rules may indicate spacing between the obtained tile chunks based on respective tile types associated with the obtained tile chunks. Operation 308 may be performed by a rule module that is the same as or similar to rule module 110, in accordance with one or more implementations.

At an operation 310, stochastic distribution of the obtained tile chunks over the map area in the map of the virtual space may be effectuated based on the chunk placement rules. For example, in response to the chunk retrieval module obtaining the first and second tile chunks, the first and second tile chunks may be stochastically distributed within the map area according to the chunk placement rules (e.g., such that the spacing between the distributed tile chunks are according to the chunk placement rules). Operation 310 may be performed by a chunk placement module that is the same as or similar to chunk placement module 108, in accordance with one or more implementations.

At an operation 312, one or more tile placement rules relating to spacing between a tile of one tile type and a tile of another tile type may be obtained. Operation 312 may be performed by a rule module that is the same as or similar to rule module 110, in accordance with one or more implementations.

At an operation 314, distribution of individual map tiles between the distributed tile chunks may be effectuated based on the tile placement rules. Operation 314 may be performed by a map filler module that is the same as or similar to map filler module 112, in accordance with one or more implementations.

Figure 4:
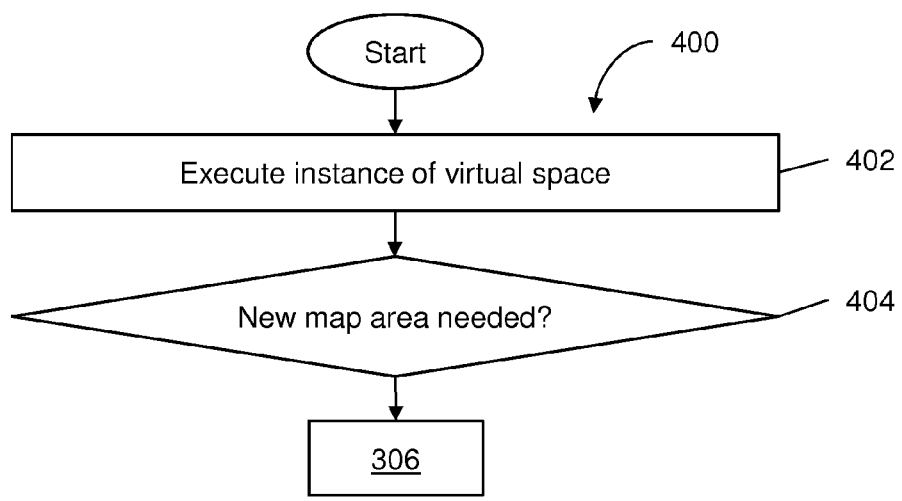
FIG. 4 illustrates a method for facilitating stochastic chunk-based map generation of a new map area based on detected in-space actions indicating a need for the new map area, in accordance with one or more implementations.

FIG. 4 illustrates a method for facilitating stochastic chunk-based map generation of a new map area based on detected in-space actions indicating a need for the new map area, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, an instance of a virtual space may be executed. Operation 402 may be performed by a game module that is the same as or similar to game module 116, in accordance with one or more implementations.

At an operation 404, a determination of whether a new map area is needed is effectuated. For example, a new map area is determined to be needed when one or more in-space actions by one or more users are detected to indicate a need for the new map area. For example, the in-space actions may relate to a need to extend a map of a virtual space, a need to regenerate an old map area in the map (e.g., to replace the old map area with the new map area), a need for additional map areas in the map, a need for temporary space in the virtual world (e.g., a new map area is needed to play a mini-game initiated by a user in the virtual world), and/or other needs for new map areas. Operation 404 may be performed by a game module that is the same as or similar to game module 116, in accordance with one or more implementations. Responsive to a determination that the new map area is needed, method 400 may proceed to operation 306 of FIG. 3 to generate the new map area via stochastic chunk-based generation of the new map area.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating stochastic chunk-based map generation, the system comprising:

non-transient electronic storage media storing individual predefined tile chunks, the individual predefined tile chunks including map tiles of different tile types for inclusion in one or more maps of a virtual space, wherein the individual predefined tile chunks include a first predefined tile chunk having a first tile of a first tile type and a second tile of a second tile type different from the first tile type, and a second predefined tile chunk having a third tile of a third tile type and a fourth tile of a fourth tile type different from the third tile type, and wherein the predefined tile chunks have a predefined shape and include a predefined arrangement of tile types, such that the first predefined tile chunk has a first predefined shape and includes a first predefined arrangement of tiles including tiles having a first tile type and tiles having a second tile type, and the second predefined tile chunk has a second predefined shape and includes a second predefined arrangement of tiles including tiles having a third tile type and tiles having a fourth tile type; and one or more processors configured by machine-readable instructions to:

obtain predefined tile chunks so that the obtained predefined tile chunks can be included in a map of the virtual space, wherein the obtained predefined tile chunks include the first and second predefined tile chunks;

obtain one or more chunk placement rules relating to spacing between the obtained tile chunks;

effectuate stochastic distribution of the obtained predefined tile chunks over a map area in the map of the virtual space based on the chunk placement rules such that, responsive to obtaining the first and second predefined tile chunks, the first and second predefined tile chunks are stochastically distributed within the map area; and effectuate distribution of individual map tiles between the distributed predefined tile chunks on the map area, wherein the chunk placement rules indicate spacing between the obtained tile chunks based on respective tiles types associated with the obtained tile chunks.

2. A system for facilitating stochastic chunk-based map generation, the system comprising:

non-transient electronic storage media storing individual predefined tile chunks, the individual predefined tile chunks including map tiles of different tile types for inclusion in one or more maps of a virtual space, wherein the individual predefined tile chunks include a first predefined tile chunk having a first tile of a first tile type and a second tile of a second tile type different from the first tile type, and a second predefined tile chunk having a third tile of a third tile type and a fourth tile of a fourth tile type different from the third tile type, and wherein the predefined tile chunks have a predefined shape and include a predefined arrangement of tile types, such that the first predefined tile chunk has a first predefined shape and includes a first predefined arrangement of tiles including tiles having a first tile type and tiles having a second tile type, and the second predefined tile chunk has a second predefined shape and includes a second predefined arrangement of tiles including tiles having a third tile type and tiles having a fourth tile type; and one or more processors configured by machine-readable instructions to:
- obtain predefined tile chunks so that the obtained predefined tile chunks can be included in a map of the virtual space, wherein the obtained predefined tile chunks include the first and second predefined tile chunks;
- obtain one or more chunk placement rules relating to spacing between the obtained tile chunks;
- effectuate stochastic distribution of the obtained predefined tile chunks over a map area in the map of the virtual space based on the chunk placement rules such that, responsive to obtaining the first and second predefined tile chunks, the first and second predefined tile chunks are stochastically distributed within the map area;
- obtain one or more tile placement rules relating to spacing between a tile of one tile type and a tile of another tile type; and
- effectuate distribution of individual map tiles between the distributed predefined tile chunks on the map area based on the one or more tile placement rules.

3. The system of claim 2, wherein the map tiles of the different tile types include one or more terrains of different terrain types such that the first tile includes a first terrain of a first terrain type, the second tile includes a second terrain of a second terrain type different from the first terrain type, the third tile includes a third terrain of a third terrain type, and the fourth tile includes a fourth terrain of a fourth terrain type different from the third terrain type.

4. The system of claim 2, wherein the one or more processors are further configured to facilitate one of more of creation, modification, or removal of one or more tile chunk sets, and wherein the tile chunk sets include a first tile chunk set having the obtained tile chunks.

5. The system of claim 4, wherein the first tile chunk is predefined with the first and second tiles, and the second tile chunk is predefined with the third and fourth tiles.

6. The system of claim 2, wherein the one or more processors are further configured to: execute an instance of the virtual space; and initiate generation of the map including the map area for the instance of the virtual space.

7. The system of claim 6, wherein the one or more processors are further configured to detect one or more in-space actions by one or more users that indicate a need for a new map area, and wherein the stochastic distribution of the obtained tile chunks over the map area is responsive to the detection of the in-space actions.

8. A method for facilitating stochastic chunk-based map generation, the method being implemented in a computer system that includes one or more processors executing computer program modules, the method comprising:

obtaining predefined tile chunks so that the obtained predefined tile chunks can be included in a map of the virtual space, wherein the obtained predefined tile chunks include first and second tile chunks, the first predefined tile chunk has a first tile of a first tile type and a second tile of a second tile type different from the first tile type, and the second predefined tile chunk has a third tile of a third tile type and a fourth tile of a fourth tile type different from the third tile type, and wherein the predefined tile chunks have a predefined shape and include a predefined arrangement of tile types, such that the first predefined tile chunk has a first predefined shape and includes a first predefined arrangement of tiles including tiles having a first tile type and ties having a second tile type, and the second predefined tile chunk has a second predefined shape and includes a second predefined arrangement of tiles having a third tile type and tiles having a fourth tile type;

obtaining one or more chunk placement rules relating to spacing between the obtained tile chunks, wherein the chunk placement rules indicate spacing between the obtained tile chunks based on respective tiles types associated with the obtained tile chunks;

effectuating stochastic distribution of the obtained predefined tile chunks over a map area in the map of the virtual space based on the chunk placement rules such that, responsive to obtaining the first and second predefined tile chunks, the first and second predefined tile chunks are stochastically distributed within the map area; and effectuating distribution of individual map tiles between the distributed predefined tile chunks on the map area.

9. A method for facilitating stochastic chunk-based map generation, the method being implemented in a computer system that includes one or more processors executing computer program modules, the method comprising:

obtaining predefined tile chunks so that the obtained predefined tile chunks can be included in a map of the virtual space, wherein the obtained predefined tile chunks include first and second tile chunks, the first predefined tile chunk has a first tile of a first tile type and a second tile of a second tile type different from the first tile type, and the second predefined tile chunk has a third tile of a third tile type and a fourth tile of a fourth tile type different from the third tile type, and wherein the predefined tile chunks have a predefined shape and include a predefined arrangement of tile types, such that the first predefined tile chunk has a first predefined shape and includes a first predefined arrangement of tiles including tiles having a first tile type and ties having a second tile type, and the second predefined tile chunk has a second predefined shape and includes a second predefined arrangement of tiles having a third tile type and tiles having a fourth tile type;

obtaining one or more chunk placement rules relating to spacing between the obtained tile chunks;

effectuating stochastic distribution of the obtained predefined tile chunks over a map area in the map of the virtual space based on the one or more chunk placement rules such that, responsive to obtaining the first and second predefined tile chunks, the first and second predefined tile chunks are stochastically distributed within the map area;

obtaining one or more tile placement rules relating to spacing between a tile of one tile type and a tile of another tile type; and effectuating distribution of individual map tiles between the distributed predefined tile chunks on the map area based on the tile placement rules.

10. The method of claim 9, wherein the map tiles of the different tile types include one or more terrains of different terrain types such that the first tile includes a first terrain of a first terrain type, the second tile includes a second terrain of a second terrain type different from the first terrain type, the third tile includes a third terrain of a third terrain type, and the fourth tile includes a fourth terrain of a fourth terrain type different from the third terrain type.

11. The method of claim 9, further comprising facilitating one of more of creation, modification, or removal of one or more tile chunk sets, wherein the tile chunk sets include a first tile chunk set having the obtained tile chunks.

12. The method of claim 9, wherein the first tile chunk is predefined with the first and second tiles, and the second tile chunk is predefined with the third and fourth tiles.

13. The method of claim 9, further comprising:
executing an instance of the virtual space; and
initiating generation of the map including the map area for the instance of the virtual space.

14. The method of claim 9, further comprising detecting one or more in-space actions by one or more users that indicate a need for a new map area, wherein the stochastic distribution of the obtained tile chunks over the map area is responsive to the detection of the in-space actions.

\* \* \* \* \*